United States Patent [19]
Hohorst

[11] Patent Number: 5,772,464
[45] Date of Patent: Jun. 30, 1998

[54] STRAIGHT CONTACT AND BRANCH CONTACT FOR ELECTRICAL CONNECTORS OR ELECTRICAL CLAMPS

[75] Inventor: Wolfgang Hohorst, Minden, Germany

[73] Assignee: WAGO Verwaltungsgesellschaft mbH, Minden, Germany

[21] Appl. No.: 789,007

[22] Filed: Jan. 27, 1997

[30] Foreign Application Priority Data

Jan. 26, 1996 [DE] Germany .................. 196 03 960.6

[51] Int. Cl.⁶ .................................................... H01R 4/24
[52] U.S. Cl. .................................. 439/395; 439/441
[58] Field of Search .................................. 439/395, 396, 439/439, 440, 441, 922

[56] References Cited

U.S. PATENT DOCUMENTS

| | | | |
|---|---|---|---|
| 3,629,794 | 12/1971 | Kourimsky | 439/440 |
| 4,538,872 | 9/1985 | Brubaker et al. | 439/396 |
| 5,088,934 | 2/1992 | Chow et al. | 439/395 |

FOREIGN PATENT DOCUMENTS 0076151  7/1953  Denmark ........................ 439/441

*Primary Examiner*—Neil Abrams
*Assistant Examiner*—Tho Dac Ta
*Attorney, Agent, or Firm*—Salter & Michaelson

[57] ABSTRACT

The invention concerns a straight contact and branch contact for the connector part of a plug connector or for a clamp for connecting several electrical conductors. It is proposed to stamp out the contact in one piece from a flat metal strip and to shape it into a U-shaped configuration in such a way that the ends of the contact, on one side, form a flat connector pin and, on the other side, form a cutting-clamp terminal. Leaf springs are freely s from the end pieces of the contact that are bent out from a back part thereof, and these springs are each directed with their free clamp edge toward the back piece, and form there a plug-in terminal.

3 Claims, 2 Drawing Sheets

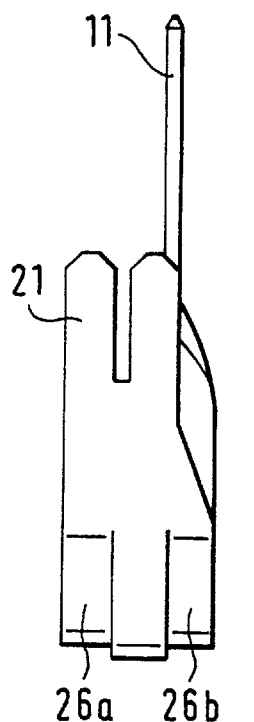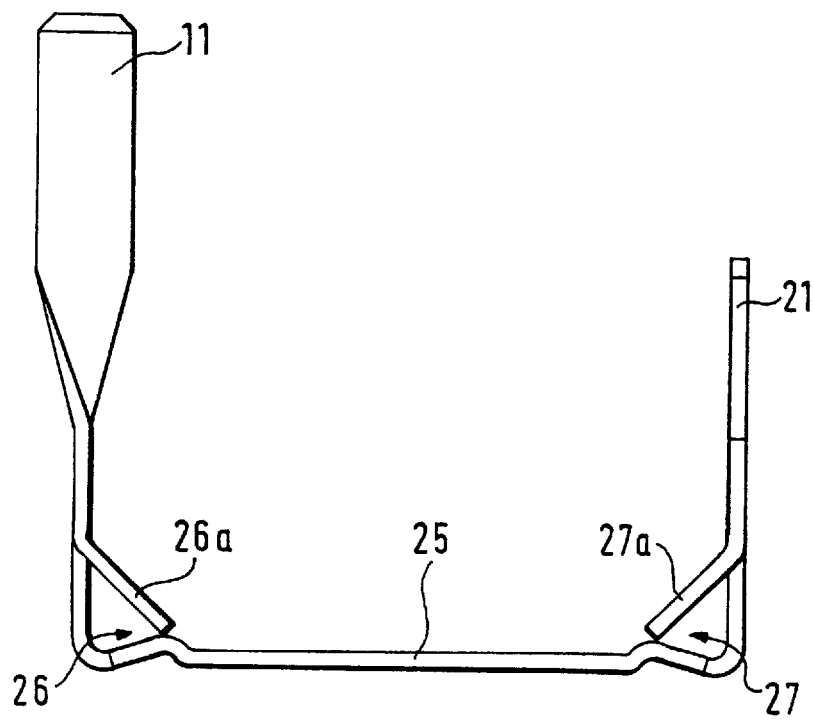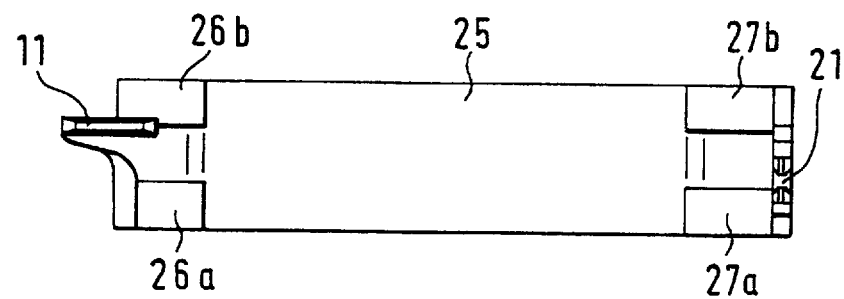

STRAIGHT CONTACT AND BRANCH CONTACT FOR ELECTRICAL CONNECTORS OR ELECTRICAL CLAMPS

BACKGROUND AND SUMMARY OF THE INVENTION

The invention concerns a straight contact and a branch contact for the connector part of an electrical connector or for an electrical clamp for connecting several electrical conductors.

Connectors, whose connector part has a flat connector pin, are known. The socket part of the connector is plugged into the connector pin, and this is joined with an electrical line, which can also be a through-conducting straight (uncut) electrical line, as is the case, e.g., in track lighting, or in lines, which are laid in line shafts. It is also known how to configure clamps in the most varied structural forms, in such a way that they have a connector pin, which serves for plugging into a socket part wired with an electrical line.

A so-called contact insert is present inside the housing made of insulating material of the connector part or the clamp (a straight contact and branch contact), which connects the connector pin (first terminal of an electrical conductor) by means of an internal busbar straight and branch connection with at least two other terminals for the electrical conductor.

The task of the invention is to improve the straight contact and branch contact for such plug connector parts, in such a way that it can be produced in a very cost favorable way in technical manufacture and so it will have a great many connection possibilities that are simple to operate for electrical conductors, despite the small manufacturing costs.

This task is resolved according to the invention in that the straight contact and branch contact have a flat connector pin, a cutting clamp terminal, a busbar, and at least one other plug-in terminal in the form of a leaf spring connection and is produced in such a way that all of the above-named structural parts are stamped in common in one piece from a flat metal strip and are shaped into a U-shaped configuration, whereby the flat connector pin, on the one side, and the cutting-clamp terminal, on the other side, form the end pieces of the busbar, which has in its turn the black part of the U-shaped configuration, and such that the end pieces bent out from the back part have a leaf spring freely stamped from the end pieces below the connector pin and/or underneath the cutting-clamp terminal, and this spring is directed with its free clamp edge toward the busbar and clamps an electrical conductor plugged in between busbar and clamp edge.

In a particularly advantageous form of embodiment of the invention, this leaf spring terminal can also be configured as a double terminal, as this is described in the following in more detail on the basis of the drawings.

In summary, it can be established that electrical plug connector parts and electrical clamps, which are equipped with straight contacts and branch contacts, can be produced according to the instructions of the invention, and these contacts are very simply stamped out in one piece from an electrically conducting sheet metal as mass-produced articles in a way that saves material and is cost favorable, and these can be applied universally as all structural parts of this type known to date, due to their multiple wiring possibilities.

The new plug connector parts or clamps of this type may be wired both manually as well as completely automatically via their cutting-clamp terminal. They have additional leaf spring terminals on both end pieces of the busbar, which can be utilized as plug-in terminals that can be manipulated manually or can also be manipulated fully automatically.

Other objects, features and advantages of the invention shall became apparent as the description thereof proceeds when considered in connection with the accompanying illustrative drawings.

DESCRIPTION OF THE DRAWING

In the drawings which illustrate the best mode presently contemplated for carrying out the present invention:

FIGS. 1–3 show the side view, front view, and top view onto a straight contact and branch contact according to the invention;

DESCRIPTION OF THE INVENTION

Figure 5:
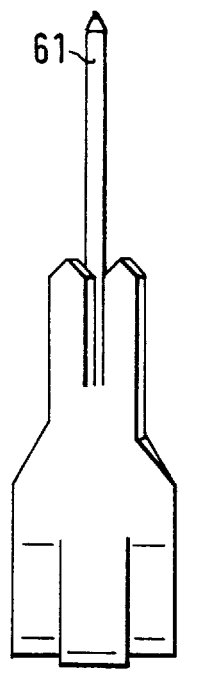
FIGS. 4–6 show the side view, front view and top view onto a second form of embodiment of a straight contact and branch contact according to the invention.

The straight contact and branch contact shown in FIGS. 1–3 is stamped out in one piece from a flat metal strip and has a flat connector pin 11, a cutting-clamp terminal 21, a busbar 25, and two plug-in terminals 26 and 27.

All of these structural parts are stamped out jointly in one piece from a flat metal strip and shaped into a U-shaped configuration such that flat connector pin 11, on the one side, and cutting clamp connection 21, on the other side, form the end pieces of busbar 25, which represents in its turn the back part of the U-shaped configuration, and that the end pieces bent out from the back part have additional plug-in terminals 26 and 27 in the form of leaf spring terminals underneath the connector pin and underneath the cutting-clamp terminal.

These leaf spring terminals are configured in such a way that two leaf springs 26a and 26b or 27a and 27b are freely stamped from the end pieces, and these springs are each directed toward busbar 25 with their free clamp edge and clamp an electrical conductor inserted between busbar and clamp edge.

It can be well recognized from FIGS. 2 and 3 that in the example of embodiment shown, the flat connector pin 11 is displaced to one side relative to the central plane of busbar 25 and that cutting-clamp terminal 21 is displaced to the other side. In this way, an electrical wire conductor impressed in cutting-clamp terminal 21 passes through the latter as a straight conductor linearly in the longitudinal direction of the straight contact and branch contact.

Figure 4:
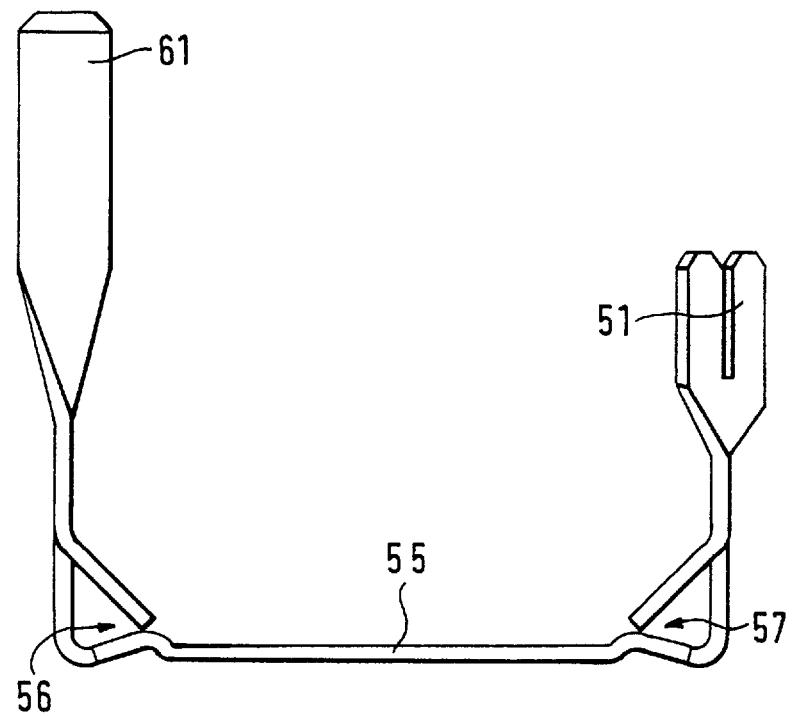
Figure 6:
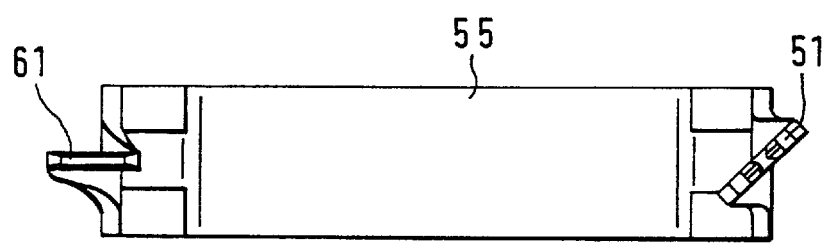

FIGS. 4–6 show a second form of embodiment of the invention. The latter has a cutting-clamp terminal 51, which, in the same way as a flat connector pin 61, is arranged in the central plane of a busbar 55. Therefore, this cutting clamp terminal 51 can also be wired with a linear straight (uncut) electrical wire conductor, if the plane of extension of the cutting clamp terminal is distorted relative to the central plane of busbar 55.

In addition, this straight contact and branch contact is again stamped out in one piece from a flat metal strip and has flat connector pin 61, cutting clamp terminal 51, busbar 55, as well as two lateral plug-in terminals 56 and 57, which again are shaped as a double terminal in the form of leaf spring terminals, as this has already been described above with reference to FIGS. 1–3.

It can be recognized that the straight contact and branch contact according to FIGS. 4–6 are constructed essentially in a center-symmetric manner. Cutting-clamp terminal 51 is placed obliquely at approximately an angle of 45°, since it corresponds to the desired laying direction of an electrical conductor wired in the cutting-clamp terminal.

What is claim is:

1. A straight contact and branch contact, for electrical connectors or electrical clamps, comprising a U-shaped body having a flat connector pin on one side of the body, a cutting-clamp terminal on the other side thereof, a busbar disposed between the flat connector pin and the cutting-clamp terminal wherein the flat connector pin and the cutting clamp terminal form end pieces of the busbar, and a leaf spring stamped from the end pieces underneath the flat connector pin and the cutting-clamp terminal for clamping an electrical conductor inserted between the busbar and a clamp edge of the leaf spring.

2. A straight contact and branch contact as set forth in claim 1, said flat connector pin, cutting-clamp terminal, busbar, and leaf spring terminal being formed as one piece from a flat metal strip.

3. A straight contact and branch contact as set forth in claim 1, said end pieces being bent out at an angle from a back part of the U-shaped body.

* * * * *